United States Patent
Lange

(10) Patent No.: US 7,909,386 B2
(45) Date of Patent: Mar. 22, 2011

(54) RAIL SYSTEM OF A MOUNTING AND GUIDE DEVICE FOR A MOTOR VEHICLE SLIDING DOOR

(75) Inventor: Marcus Lange, Pfungstadt (DE)

(73) Assignee: GM Global Technology Operations LLC, Detroit, MI (US)

(*) Notice: Subject to any disclaimer, the term of this patent is extended or adjusted under 35 U.S.C. 154(b) by 272 days.

(21) Appl. No.: 12/101,438

(22) Filed: Apr. 11, 2008

(65) Prior Publication Data
US 2008/0252098 A1    Oct. 16, 2008

(30) Foreign Application Priority Data
Apr. 12, 2007 (DE) .......... 10 2007 017 169

(51) Int. Cl.
*B60J 7/00* (2006.01)
(52) U.S. Cl. .......... 296/155; 49/360
(58) Field of Classification Search .......... 296/146.1, 296/151, 155, 146.9, 146.11; 49/209, 213, 49/214, 215, 216, 221, 223, 225
See application file for complete search history.

(56) References Cited

U.S. PATENT DOCUMENTS

| | | | | |
|---|---|---|---|---|
| 1,712,562 A * | 5/1929 | Jeffers | .......... | 49/214 |
| 4,932,715 A * | 6/1990 | Kramer | .......... | 296/155 |
| 5,884,433 A * | 3/1999 | Watanabe et al. | .......... | 49/360 |
| 6,152,519 A * | 11/2000 | Blank et al. | .......... | 296/155 |
| 7,159,929 B2 * | 1/2007 | Fukushima et al. | .......... | 296/155 |
| 7,243,461 B2 * | 7/2007 | Rogers et al. | .......... | 49/360 |
| 7,654,608 B2 * | 2/2010 | Krajenke et al. | .......... | 296/155 |
| 2003/0009846 A1 | 1/2003 | Durand et al. | | |
| 2008/0224499 A1 * | 9/2008 | Yokomori | .......... | 296/155 |

FOREIGN PATENT DOCUMENTS

| | | |
|---|---|---|
| DE | 2008946 A1 | 10/1970 |
| DE | 19806762 A1 | 8/1999 |
| DE | 10300158 B3 | 3/2004 |

(Continued)

OTHER PUBLICATIONS

German Patent Office, German Search Report for German Application No. 102007017169.4, Sep. 18, 2007.

(Continued)

*Primary Examiner* — Joseph D Pape
(74) *Attorney, Agent, or Firm* — Ingrassia Fisher & Lorenz, P.C.

(57) ABSTRACT

A rail system of a mounting and guide device for a sliding door of a motor vehicle is provided with a drawn-in rear part, by which the sliding door is displaceable between a closed position in which the sliding door closes a door opening and an open position in which the door is located laterally adjacent to the door opening. The rail system has a guide rail connected to the vehicle body, which is provided with an arc section, which is curved toward the vehicle middle following the drawn-in rear part and a first assembly assigned to the guide rail having a mounting unit engaging in the guide rail, which is displaceable along the guide rail with the aid of a least one displacement element. The rail system also has a support element rigidly connected to the mounting unit and projecting from the mounting unit in front of the displacement element, to which the sliding door is attached so it is pivotably movable.

12 Claims, 1 Drawing Sheet

FOREIGN PATENT DOCUMENTS

| | | |
|---|---|---|
| DE | 10326241 A1 | 1/2005 |
| EP | 0102053 A2 | 3/1984 |
| EP | 1462285 A1 | 9/2004 |
| EP | 1591589 A1 | 11/2005 |
| EP | 1911917 A1 | 4/2008 |

OTHER PUBLICATIONS

European Patent Office, European Search Report for European Application No. 08006740.8, Apr. 1, 2009.

* cited by examiner ical aspects.
RAIL SYSTEM OF A MOUNTING AND GUIDE DEVICE FOR A MOTOR VEHICLE SLIDING DOOR

CROSS-REFERENCE TO RELATED APPLICATION

This application claims priority to German Patent Application No. 102007017169.4, filed Apr. 12, 2007, which is incorporated herein by reference in its entirety.

TECHNICAL FIELD

The present invention is in the field of motor vehicle technology and relates to a rail system of a mounting and guide device for a motor vehicle sliding door. Furthermore, the invention relates to a mounting and guide device for a motor vehicle sliding door provided with such a rail system, and a motor vehicle equipped with such a mounting and guide device.

BACKGROUND

Modern passenger automobiles, in particular vehicles of the van type, are increasingly equipped with side doors, which are installed in such a manner that they may be displaced between a closed position, in which they close the door opening, and an open position, in which they extend along the outside lateral face of the vehicle and expose the door opening ("sliding doors"). The essential reason for this is the small amount of lateral space required when opening the sliding doors, which allow the door opening to be completely exposed in particular even in tight parking spaces. Sliding doors thus allow more comfortable entry and exit of the passengers, as well as easier loading and unloading of the vehicle.

A lateral sliding door is typically connected to a vehicle using a multipurpose retainer displaceable in rails. The multipurpose retainer usually comprises an upper guide rail, which is situated proximally to the vehicle roof in the door opening, a lower guide rail, which is situated proximally to the door threshold area in the door opening, and a middle guide rail, which is situated in the side wall of the vehicle to the rear of the door opening approximately at waist height. The sliding door is connected to a carrier construction for this purpose, which engages in each of the guide rails so it is displaceable.

The carrier construction in turn comprises multiple assemblies assigned to the particular guide rails. These assemblies are each constructed from a support arm connected to the sliding door and a roll carrier connected to the support arm, having two rolls, for example, which is guided and retained by the guide rail so it is displaceable. The support arm is typically connected to the roll carrier approximately in a central position of the roll carrier, for example, between the two rolls.

If the largest possible door opening is to be available, a relatively long displacement path of the sliding door in the longitudinal direction of the motor vehicle along its lateral face is necessary, so that the middle guide rail usually extends up to the vehicle rear.

To avoid contact between the sliding door and the vehicle body upon displacement of the sliding door into its open position, until now rather box-shaped styling in a perspective view of the rear part of the motor vehicle has been necessary. In passenger automobiles, in particular of the van type, having a relatively large vehicle interior, such a design, which is similar to utility vehicles, is disadvantageous from commercial aspects.

In view of the foregoing, it would be desirable here to provide the vehicle with a drawn-in rear part, in which in the perspective frontal view of the vehicle, the two lateral faces of the vehicle curve toward the vehicle middle in its rear part, which provides the vehicle with a more elegant appearance in spite of a relatively large interior. In addition, other desirable objects, features and characteristics will become apparent from the subsequent summary, detailed description, and the appended claims, taken in conjunction with the accompanying drawings and this background.

SUMMARY

At least one object of the present invention comprises providing an attachment for lateral sliding doors on the vehicle body which allows the vehicle to be provided with a (more strongly) drawn-in rear part, without the sliding door colliding with the vehicle body during displacement into its open position.

This object and other objects is achieved with a rail system of a mounting and guide device for a sliding door of a motor vehicle provided with a drawn-in rear part by which the sliding door is displaceable between a closed position, in which the sliding door closes a door opening, and an open position, in which the door is located laterally adjacent to the door opening. The rail system comprises a guide rail connected to the vehicle body, which is provided with an arc section, which is curved toward the vehicle middle following the drawn-in rear part and a first assembly, assigned to the guide rail, having a mounting unit engaging in the guide rail, which is displaceable along the guide rail with the aid of at least one displacement means. The rail system also comprises a support element, rigidly connected to the mounting unit and projecting from the mounting unit in front of the displacement means, to which the sliding door is attached so it is pivotably movable.

According to an exemplary embodiment, a rail system, such as a rail/carriage system, of a mounting and guide device for a sliding door, guided in rails so it is displaceable, of a motor vehicle is provided with a drawn-in rear part, by which the sliding door is displaceable between a closed position, in which the sliding door closes a door opening, and an open position, in which the door is located laterally adjacent to the door opening.

The rail system of the mounting and guide device for the sliding door situated to the rear of the door opening comprises a guide rail connected fixed to the vehicle body and an assembly assigned to the guide rail.

The guide rail may be situated at waist height (e.g., middle height) of the motor vehicle, for example. It follows the course of the lateral face of the motor vehicle, which is drawn-in in the rear direction toward the vehicle middle, and because of this is implemented as arched on its rear end section. This arched end section, referred to in the following as the "arc section" of the guide rail, is thus curved toward the vehicle middle following the external skin of the drawn-in rear part.

The assembly assigned to the guide rail comprises a mounting unit engaging in the guide rail, which is mounted so it is displaceable in the guide rail. The mounting unit is mounted so it is displaceable along the guide rail with the aid of at least one displacement means, such as a sliding or rolling element. The mounting unit is used for guiding and mounting the sliding door in the guide rail so it is displaceable.

Furthermore, the assembly assigned to the guide rail comprises a support element rigidly connected to the mounting unit, which projects from the mounting unit on the front side of the displacement means. The support element may be implemented as an oblong support arm, for example. The sliding door is attached to the support element so it is pivotably movable using a pivot bearing. The pivotably-movable mounting of the sliding door on the support element allows pivoting of the sliding door around a vertical pivot axis.

Through the rail system according to an exemplary embodiment, it is advantageously made possible to provide the vehicle with a drawn-in rear part on the basis of an outward movement of the attachment point for the sliding door, caused by the design of the assembly, during displacement of the mounting unit in the curved arc section of the guide rail.

In an advantageous embodiment of the rail system of a mounting and guide device for the lateral sliding door of a motor vehicle, the mounting unit is provided with at least two displacement means spaced apart in the vehicle longitudinal direction. In this case, the support element rigidly connected to the mounting unit projects from the mounting unit on the front side of the front displacement means.

In a further advantageous embodiment of the rail system, a mounting and guide device for the lateral sliding door of a motor vehicle, at least a partial section of the support element extends toward the vehicle front. In particular in this case, it is advantageous if the support element is provided with a front end section oriented away from the vehicle, to which the sliding door is attached so it is pivotably movable. The front end section oriented away from the vehicle may assume an angle of 90° to a (partial) section of the support element oriented toward the vehicle front.

Furthermore, the embodiment extends to a mounting and guide device for a sliding door, guided in rails so it is displaceable, of a motor vehicle provided with a drawn-in rear part, by which the sliding door is displaceable between a closed position, in which the sliding door closes a door opening, and an open position, in which the door is located laterally adjacent to the door opening, which is equipped to the rear of the vehicle opening with at least one rail system as described above. This rail system is identified as the first rail system for the purpose of differentiation from the second rail system described below.

In an advantageous embodiment of the mounting and guide device for a sliding door, guided in rails so it is displaceable, of a motor vehicle provided with a drawn-in rear part, it also comprises at least one second rail system in the area of the door opening, which has a guide rail connected fixed to the vehicle body and an assembly assigned to the guide rail.

The guide rail of the second rail system may be an upper guide rail which is situated in the door opening in proximity to the vehicle roof, for example. It may also be a lower guide rail which is situated in the door opening in proximity to the door threshold area.

The second assembly assigned to the second guide rail of the second rail system comprises a mounting unit engaging in the second guide rail, which is mounted in the second guide rail so it is displaceable. The mounting unit is mounted so it is displaceable along the guide rail with the aid of at least one displacement means, for example, a sliding or rolling element. The mounting unit is used for guiding and mounting the sliding door in the guide rail so it is displaceable.

Furthermore, the assembly assigned to the guide rail of the second rail system comprises a support element connected to the mounting unit and the sliding door, such as an oblong support arm, which connects the sliding door to the mounting unit so it is pivotably movable. A pivot bearing may be provided between the support element and the sliding door and/or between the support element and the mounting unit for the pivotably-movable mounting of the sliding door on the mounting unit. The pivotably-movable mounting of the sliding door on the mounting unit allows pivoting of the sliding door around a vertical pivot axis.

Furthermore, the embodiment extends to a motor vehicle provided with a drawn-in rear part, which is equipped with at least one mounting and guide device as described above for a lateral sliding door guided in rails so it is displaceable.

BRIEF DESCRIPTION OF THE DRAWINGS

The present invention will hereinafter be described in conjunction with the following drawing figure.

DETAILED DESCRIPTION

Figure 1:
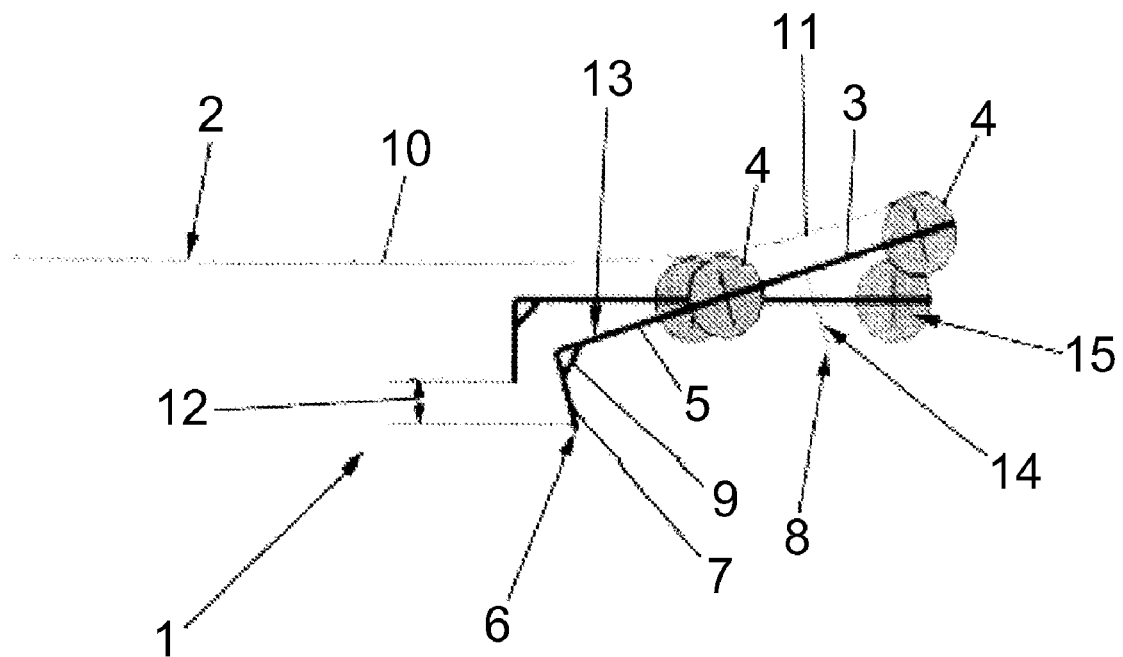
FIG. 1 shows a schematic illustration of the rail system according to an embodiment corresponding to a horizontal partial section through the rear part of a motor vehicle.

The following detailed description is merely exemplary in nature and is not intended to limit the invention or the application and uses of the invention. Furthermore, there is no intention to be bound by any theory presented in the preceding background of the invention or the following detailed description.

FIG. 1 will now be explained, in which an exemplary embodiment of the rail system according to the invention is illustrated in a schematic illustration. The schematic illustration of FIG. 1 corresponds to a view from above of a horizontal partial section through the rail system in the area of the rear part of a vehicle, which is drawn in toward the vehicle middle.

Accordingly, the rail system, identified as a whole by the reference numeral 1, comprises a guide rail 2 and an assembly assigned to the guide rail 2, which is in turn composed of multiple components, as explained below.

The guide rail 2, which is molded into the lateral face of the vehicle body (not shown in greater detail) and is connected fixed thereto, extends in an essentially horizontal course in the area between the door opening of the sliding door and the vehicle rear. The guide rail 2 comprises a linear rail section 10 extending essentially in the vehicle longitudinal direction and a curved arc section 11 adjoining it to the rear, which follows the drawn-in rear part of the vehicle and is accordingly curved toward the vehicle middle. In FIG. 1, the vehicle rear is accordingly located on the right side, while the vehicle front is located on the left side.

The assembly assigned to the guide rail 2 comprises a roll carrier 3 ("carriage") engaging in the guide rail 2, having two rolls 4 situated at a distance to one another in the vehicle longitudinal direction, by which the roll carrier 3 is mounted so it is displaceable along the guide rail 2.

Furthermore, the assembly comprises a support arm 13, which is fastened rigidly to the roll carrier 3 in front of the two rolls 4 and projects from the front of the roll carrier 3. The support arm 13 is composed of two support arm sections, namely a first support arm section 5, which is connected at its end section to the roll carrier 3 and extends essentially in the vehicle longitudinal direction in an extension of the roll carrier 3, and a second support arm section 6 connected to the other end section of the first support arm section 5.

The second support arm section 6 is connected at its end section to the first support arm section 5, extends essentially at a right angle to the first support arm section 5, and is oriented away from the vehicle. The two support arm sections 5, 6 are supported against one another by a support strut 9. At its other end section, the second support arm section 6 forms an attachment point 7 for the pivotably-movable fastening of the sliding door using a pivot bearing.

The typical fastening of a typical support arm 14 on the roll carrier 3 is shown solely for comparison thereto in FIG. 1. The support arm 14 is connected at its end section to the roll carrier 3 approximately in the middle between the two rolls 4 and projects from the roll carrier at a right angle to a connection line of the two rolls 4. At its other end section, the support arm 14 forms a typical attachment point 8 for the sliding door, which thus assumes an approximately equal distance from the two rolls 4.

If the sliding door is entirely opened, the roll carrier 3 is displaced to the rear from the linear rail section 10 into the curved arc section 11. As the roll carrier 3 is pushed into the arc section 11, the attachment point 7 of the support arm 13 for the sliding door and thus the sliding door itself are moved away from the vehicle. It is shown solely for comparative purposes in FIG. 1 how an assembly 15 corresponding to an upper assembly would be guided on a linear guide rail without the curved arc section (not shown in greater detail). The path section 12 identified by the double arrow is thus recognizable, which the attachment point 7 passes through as a result of the curved arc section 11 of the guide rail 2.

Because, in the rail system according to the invention, the attachment point 7 of the sliding door and thus the sliding door itself are moved away from the vehicle, the roll carrier 3 may be pushed into the curved arc section 11 of the guide rail 2 without danger of the sliding door colliding with the vehicle body, so that the rear part may be designed drawn-in in the desired way. It is only to be ensured that an end stop is set for the sliding door and/or for the displacement of the roll carrier 3 in the arc section 11 in such a manner that the sliding door does not or only slightly approaches the guide rail 2 and/or the vehicle body. It may be advantageous if the trailing roll 4 and/or the roll carrier 3 is displaced enough to the rear into the arc section 11 upon opening of the sliding door that the "gain" of distance of the sliding door from the guide rail 2 and/or vehicle body generated by the path distance 12 is applied again, so that the sliding door assumes the same distance from the vehicle body in its end stop in the open position which it has when the roll carrier 3 is located in the linear rail section 10 of the guide rail 2.

In contrast to the typical attachment point 8 for the sliding door, the rear part of the motor vehicle may thus be designed as drawn-in or at least more strongly drawn-in, because a collision between sliding door and vehicle body may be reliably avoided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A rail system of a mounting and guide device for a sliding door of a motor vehicle provided with a drawn-in rear part, by which the sliding door is displaceable between a closed position, in which the sliding door closes a door opening, and an open position, in which the door is located laterally adjacent to the door opening, the rail system comprising:
   a guide rail connected to the vehicle body, which is provided with an arc section that is curved toward the vehicle middle following the drawn-in rear part;
   a first assembly assigned to the guide rail having a mounting unit engaging in the guide rail, which is displaceable along the guide rail with the aid of at least one displacement means; and
   a support element rigidly connected to the mounting unit and projecting from the mounting unit laterally in front of the displacement means and toward the front end of the motor vehicle, to which the sliding door is attached so it is pivotably movable.

2. The rail system according to claim 1, wherein the mounting unit is provided with at least two displacement means spaced apart in the vehicle longitudinal direction.

3. The rail system according to claim 1, wherein at least a partial section of the support element extends toward the vehicle front.

4. The rail system according to claim 1, wherein the support element is provided with a front end section, oriented away from the vehicle, to which the sliding door is attached so it is pivotably movable.

5. The rail system according to claim 1, wherein the at least one displacement means is implemented in the form of a roller.

6. A mounting and guide device for a sliding door of a motor vehicle provided with a drawn-in rear part, by which the sliding door is displaceable between a closed position in which the sliding door closes a door opening and an open position in which the door is located laterally adjacent to the door opening, the mounting and guide device comprising:
   a guide rail connected to the vehicle body that is provided with a rear arc section and curved toward the vehicle middle following the drawn-in rear part;
   a first assembly assigned to the guide rail having a mounting unit engaging in the guide rail, which is displaceable along the guide rail with the aid of at least one displacement means; and
   a support element, comprising:
      a first support arm section rigidly connected to the mounting unit and projecting from the mounting unit away from the rear arc section and toward the front end of the motor vehicle; and
      a second support arm section to which the sliding door is attached so it is pivotably movable, the second support arm section extending from the first support arm section at approximately a ninety degree angle.

7. A rail system for deployment onboard a vehicle having a sliding door movable between a closed position and an open position, the rail system comprising:
   a guide rail having a linear rail section and a curved arc section;
   an assembly configured to slide along the guide rail from the linear rail section to the curved arc section as the sliding door is moved from the closed position to the open position, respectively; and
   a support element coupled to the assembly and projecting therefrom toward the front end of the vehicle, the support element having an attachment point configured to be pivotably coupled to the sliding door, the support element moving in conjunction with the assembly as the assembly slides from the linear rail section to the curved arc section such that the sliding door, when pivotably coupled to the attachment point, is moved laterally outward from the vehicle body as the sliding door is moved into the open position.

8. A rail system according to claim 7, wherein the support element comprises a first support arm section coupled to an end section of the assembly and extending therefrom.

9. A rail system according to claim 8, wherein the support element further comprises a second support arm section coupled to the first support arm section substantially opposite the assembly.

10. A rail system according to claim 9, wherein the first support arm section generally extends along the longitudinal axis of the vehicle, and wherein the second support arm section extends from the first support arm section at approximately a ninety degree angle.

11. A rail system according to claim 9, further comprising a support strut coupled between the first support arm section and the second support arm section.

12. A rail system according to claim 10, wherein the assembly comprises a roll carrier from which the first support arm section extends, the first support arm section substantially co-linear with the longitudinal axis of the roll carrier.

* * * * *